United States Patent
Lu et al.

(10) Patent No.: US 12,457,674 B2
(45) Date of Patent: Oct. 28, 2025

(54) LIGHTING PARAMETER TOUCH CONTROL PANEL

(71) Applicant: Xiamen PVTECH Co., Ltd., Fujian (CN)

(72) Inventors: Fuxing Lu, Fujian (CN); Dasheng Li, Fujian (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 119 days.

(21) Appl. No.: 18/527,406

(22) Filed: Dec. 4, 2023

(65) Prior Publication Data

US 2024/0414830 A1 Dec. 12, 2024

(30) Foreign Application Priority Data

Jun. 9, 2023 (CN) .......................... 202310677960.0

(51) Int. Cl.
*H05B 47/175* (2020.01)
*H05B 47/105* (2020.01)

(52) U.S. Cl.
CPC ......... *H05B 47/196* (2024.01); *H05B 47/105* (2020.01)

(58) Field of Classification Search
None
See application file for complete search history.

(56) References Cited

U.S. PATENT DOCUMENTS

| | | | | |
|---|---|---|---|---|
| 10,985,972 B2* | 4/2021 | Emigh | ..................... | H04L 67/10 |
| 11,329,867 B2* | 5/2022 | Emigh | ................. | H04L 12/2827 |
| 11,563,595 B2* | 1/2023 | Emigh | ................. | G06F 3/04847 |
| 2010/0060607 A1* | 3/2010 | Ludwig | .................. | G06F 3/0346 |
| | | | | 345/173 |
| 2010/0231421 A1* | 9/2010 | Rawls-Meehan | .... | A47C 21/003 |
| | | | | 341/20 |
| 2014/0324229 A1* | 10/2014 | Leen | ....................... | G05D 23/19 |
| | | | | 700/276 |
| 2015/0061539 A1* | 3/2015 | Hirayama | .......... | H05B 47/1975 |
| | | | | 315/292 |
| 2016/0054027 A1* | 2/2016 | Dyess | ..................... | F24F 11/30 |
| | | | | 700/277 |

(Continued)

FOREIGN PATENT DOCUMENTS

| | | | | |
|---|---|---|---|---|
| GB | 2525165 A | * | 10/2015 | ........... H05B 47/105 |
| WO | WO-02099780 A2 | * | 12/2002 | ........... H05B 47/155 |

(Continued)

*Primary Examiner* — Srinivas Sathiraju
(74) *Attorney, Agent, or Firm* — Bruce Stone LLP

(57) ABSTRACT

A lighting parameter touch control panel includes a touch board and a touch point calculator. The touch board includes a plurality of first touch points and a plurality of second touch points disposed on the substrate and arranged in a staggered manner. The first touch points are not adjacent to each other and the second touch points are not adjacent to each other. The touch point calculator is connected to the touch board. The first touch point and the second touch point in a touch area, of the touch board, touched by a target object and the target object form a conducting loop to generate a touch signal. The touch point calculator calculates the quantity of the first touch point and the second touch point in the conducting loop according to the touch signal so as to generate a calculating signal.

9 Claims, 4 Drawing Sheets

(56) References Cited

U.S. PATENT DOCUMENTS

| | | | |
|---|---|---|---|
| 2017/0041886 A1* | 2/2017 | Baker | H04B 10/116 |
| 2017/0278383 A1* | 9/2017 | Dimberg | G06F 3/0488 |
| 2017/0279630 A1* | 9/2017 | Anderson | H05B 47/19 |
| 2017/0280533 A1* | 9/2017 | Dimberg | H05B 45/00 |
| 2018/0191517 A1* | 7/2018 | Emigh | G06F 3/04847 |
| 2019/0019403 A1* | 1/2019 | Dimberg | H05B 47/19 |
| 2019/0045610 A1* | 2/2019 | Verfuerth | H05B 47/1985 |
| 2019/0125905 A1* | 5/2019 | Weeks, Jr. | A61L 2/24 |
| 2020/0013279 A1* | 1/2020 | Dimberg | H05B 47/175 |
| 2020/0028734 A1* | 1/2020 | Emigh | H04L 67/10 |
| 2020/0077483 A1* | 3/2020 | Agarwal | H05B 47/19 |
| 2020/0083003 A1* | 3/2020 | Altonen | H05B 47/19 |
| 2020/0294401 A1* | 9/2020 | Kerecsen | G08G 1/205 |
| 2020/0337144 A1* | 10/2020 | Smith | H05B 47/10 |
| 2021/0023245 A1* | 1/2021 | Weeks, Jr. | A61L 2/084 |
| 2021/0068238 A1* | 3/2021 | Twaddell | H05B 47/19 |
| 2021/0191350 A1* | 6/2021 | Baker | G06F 3/04817 |
| 2021/0194758 A1* | 6/2021 | Emigh | H04L 67/125 |
| 2022/0224596 A1* | 7/2022 | Emigh | H04L 12/2832 |
| 2023/0146133 A1* | 5/2023 | McKinley | A61B 1/00006 600/117 |
| 2023/0239172 A1* | 7/2023 | Emigh | H05B 45/10 715/771 |
| 2024/0414830 A1* | 12/2024 | Lu | H05B 47/19 |

FOREIGN PATENT DOCUMENTS

| | | | | |
|---|---|---|---|---|
| WO | WO-2006031753 A2 * | 3/2006 | | H05B 45/10 |
| WO | WO-2010111256 A2 * | 9/2010 | | G01J 1/02 |
| WO | WO-2013141792 A1 * | 9/2013 | | A61M 21/00 |
| WO | WO-2014128594 A1 * | 8/2014 | | H05B 33/0845 |
| WO | WO-2017017665 A1 * | 2/2017 | | G05B 11/01 |
| WO | WO-2021185627 A1 * | 9/2021 | | G06F 21/32 |
| WO | WO-2022148723 A1 * | 7/2022 | | H05B 47/12 |
| WO | WO-2022152648 A1 * | 7/2022 | | G06V 10/235 |
| WO | WO-2023015607 A1 * | 2/2023 | | G06F 3/0481 |
| WO | WO-2023126234 A1 * | 7/2023 | | H05B 47/105 |
| WO | WO-2023172749 A1 * | 9/2023 | | H05B 45/20 |
| WO | WO-2024046815 A1 * | 3/2024 | | H05B 47/11 |

* cited by examiner

LIGHTING PARAMETER TOUCH CONTROL PANEL

BACKGROUND OF THE INVENTION

1. Field of the Invention

The present invention relates to a control panel, in particular to a lighting parameter touch control panel.

2. Description of the Prior Art

Due to advances in technology, smart home systems have gradually gained attention from people. However, the lighting control functions of currently available smart home systems still have many shortcomings needed to be improved. For example, users usually control lighting devices via mechanical switches, remote controller or the applications executed by smart phones.

However, different appliances require different remote controllers, so users may have too many remote controls in their homes, which is highly inconvenient. Furthermore, although smart phones can provide many functions, users need to install corresponding applications on their smart phones, which is not only inconvenient but also tends to be influenced by many factors, such as network signals and compatibility. In addition, although mechanical switches are relatively convenient to use, these switches cannot provide stepless dimming and stepless color temperature adjusting functions. Moreover, the wiring of mechanical switches is complex, which increases the cost of smart home systems.

China Patent Publication No.: CN110597079A and US Patent Publication No.: US20070230159A1 also disclose lighting control technologies, but these technologies still cannot effectively solve the above problems.

SUMMARY OF THE INVENTION

One embodiment of the present invention provides a lighting parameter touch control panel, which includes a touch board and a touch point calculator. The touch board includes a plurality of first touch points and a plurality of second touch points disposed on the substrate and arranged in a staggered manner. The first touch points are not adjacent to each other and the second touch points are not adjacent to each other. The touch point calculator is connected to the touch board. The first touch point and the second touch point in a touch area, of the touch board, touched by a target object and the target object form a conducting loop to generate a touch signal. The touch point calculator calculates the quantity of the first touch point and the second touch point in the conducting loop according to the touch signal so as to generate a calculating signal.

In one embodiment, the initial voltage of each of the first touch points is a first voltage and the initial voltage of each of the second touch points is a second voltage. The first voltage is of high level and the second voltage is of low level.

In one embodiment, the initial voltage of the first touch point within the touch area decreases, such that the first touch point, the second touch point and the target object form the conducting loop.

In one embodiment, the lighting parameter touch control panel further includes a controller. The controller generates a lighting parameter adjusting signal according to the calculating signal.

In one embodiment, the lighting parameter adjusting signal is a dimming signal or a color temperature adjusting signal.

In one embodiment, the lighting parameter touch control panel further includes a communication module. The controller transmits the lighting parameter adjusting signal to a lighting device via the communication module.

In one embodiment, the communication module is a Bluetooth module, a WiFi module, a ZigBee module or an infrared module.

In one embodiment, the lighting parameter touch control pane further includes a power supplying module connected to the touch point calculator, the controller and the communication module. The power supplying module powers the touch point calculator, the controller and the communication module.

In one embodiment, the power supplying module is a battery, a voltage converter or other similar components.

In one embodiment, the calculating signal is a digital signal.

The lighting parameter touch control panel in accordance with the embodiments of the present invention may have the following advantages:

(1) In one embodiment of the present invention, the touch board of the lighting parameter touch control panel has a special structure to provide a precise touch point calculation mechanism. As a result, the lighting parameter touch control panel can accurately calculate the touch area of the target object so as to enhance the touch sensitivity. Therefore, the lighting parameter touch control panel can not only control a lighting device to be turned on or off, but also can provide the dimming and color temperature adjustment functions simultaneously. Consequently, the functionality of the lighting parameter touch control panel is more comprehensive and user-friendly.

(2) In one embodiment of the present invention, the lighting parameter touch control panel is provided with a communication module, so the lighting parameter touch control panel can control all lighting devices within a house. The user can simply place the lighting parameter touch control panel in the appropriate location to control all lighting devices wirelessly, without the need to install any applications. Furthermore, the lighting parameter touch control panel will not be influenced by network signals, compatibility and other factors. Therefore, the lighting parameter touch control panel can conform to actual requirements.

(3) In one embodiment of the present invention, the lighting parameter touch control panel is provided with a communication module, so the lighting parameter touch control panel can control all lighting devices within the house. The user can control all lighting devices wirelessly by placing the touch-sensitive lighting parameter control panel in the appropriate location without mechanical switches and complex wiring. Consequently, the lighting parameter touch control panel can significantly reduce the cost of smart home systems, so the application of the lighting parameter touch control panel can be more comprehensive.

(4) In one embodiment of the present invention, the lighting parameter touch control panel can achieve stepless dimming and color temperature adjusting functions, so the lighting parameter touch control panel can provide optimized dimming and color temperature adjusting functions. Therefore, the user can adjust the lighting device via the lighting parameter touch control panel to achieve the desired brightness and color temperature. Consequently, the touch-sensitive lighting parameter control panel can meet the needs of different users and effectively improve the shortcomings of prior art.

(5) In one embodiment of the present invention, the lighting parameter touch control panel has a simple structure, so the lighting parameter touch control panel can achieve the desired technical effects without significantly increasing the cost thereof. Thus, the lighting parameter touch control panel can meet the requirements of various applications. Therefore, the manufacturing cost of the lighting parameter touch control panel can be greatly reduced, so the lighting parameter touch control panel can achieve high practicality.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
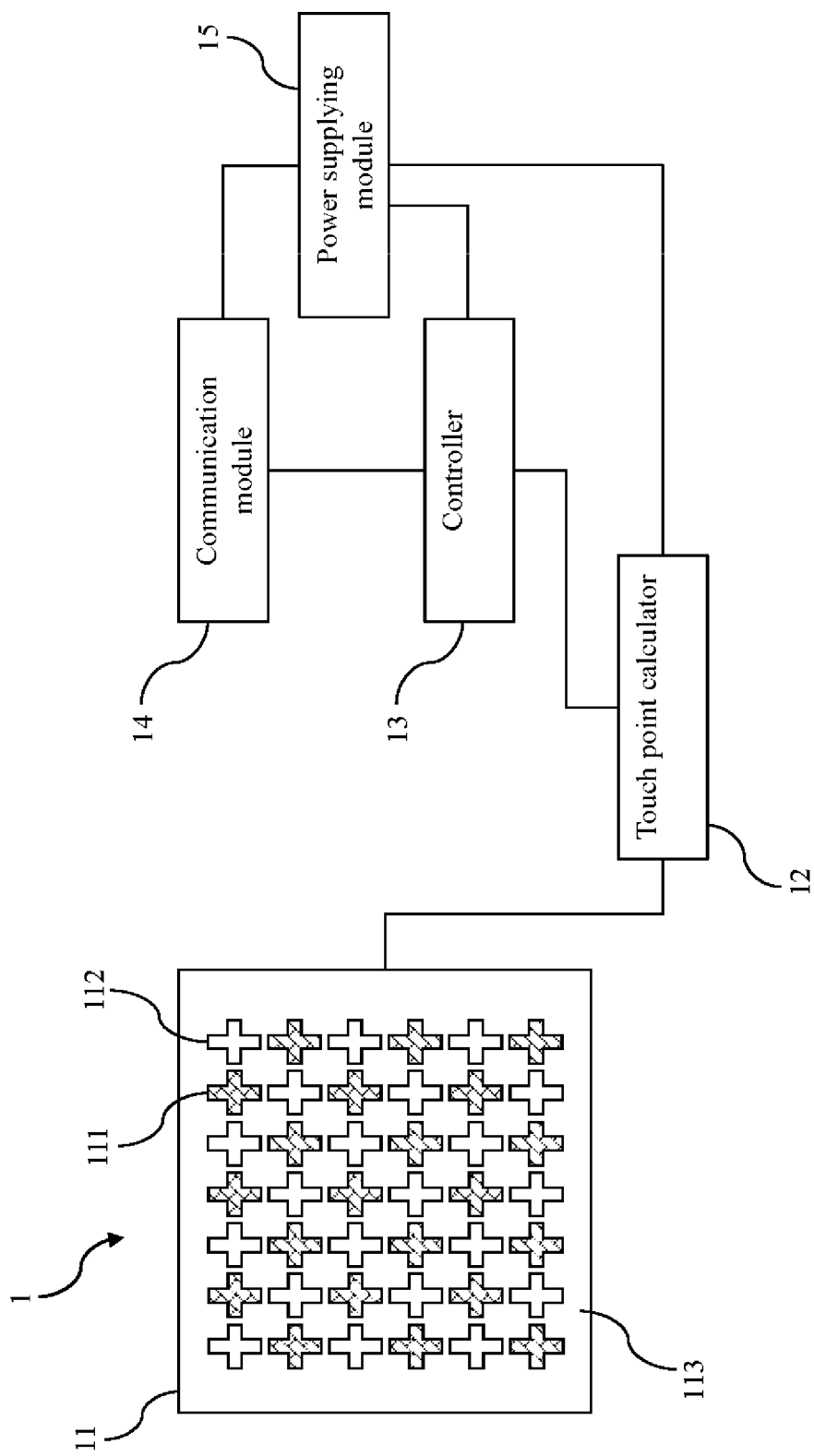
FIG. 1 is the schematic view of the structure of the lighting parameter touch control panel in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is the schematic view of the structure of the lighting parameter touch control panel in accordance with one embodiment of the present invention. As shown in FIG. 1, the lighting parameter touch control panel 1 includes a touch board 11, a touch point calculator 12, a controller 13, a communication module 14, and a power supplying module 15.

The touch board 11 includes a substrate 113, a plurality of first touch points 111, and a plurality of second touch points 112. The first touch points 111 and the second touch points 112 are disposed on the substrate 113. In this embodiment, the first touch points 111 and the second touch points 112 are metal contacts or metal blocks (e.g., copper, gold, etc.). The shapes of the first touch points 111 and the second touch points 112 can be the same. In this embodiment, the shapes of the first touch points 111 and the second touch points 112 can be cross-shaped. In another embodiment, the first touch points 111 and the second touch points 112 can also be resistors with high resistance. The first touch points 111 and the second touch points 112 are arranged in a staggered manner to form a matrix. The first touch points 111 are not adjacent to each other, and the second touch points 112 are also not adjacent to each other. In other words, the touch points at the left and right sides of any first touch point 111 in any column of the matrix must be the second touch point 112. The touch points at the left and right sides of any second touch point 112 in any column of the matrix must be the first touch point 111. Similarly, the touch points above and below any first touch point 111 in any row of the matrix must be the second touch point 112. The touch points above and below any second touch point 112 in any row of the matrix must be the first touch points 111. In this embodiment, the matrix is a 7×6 matrix. In another embodiment, the size of the matrix can be adjusted according to actual needs. In one embodiment, the substrate 113 can be a printed circuit board, a flexible circuit board, or other similar components.

The touch point calculator 12 is connected to the touch board 11. In one embodiment, the touch point calculator 12 can be a microcontroller (MCU), a central processing unit (CPU), an application-specific integrated circuit (ASIC), a field-programmable gate array (FPGA) or other similar components.

The controller 13 is connected to the touch point calculator 12. In one embodiment, the controller 13 can be a microcontroller (MCU), a central processing unit (CPU), an application-specific integrated circuit (ASIC), a field-programmable gate array (FPGA) or other similar components.

The communication module 14 is connected to the controller 13. In one embodiment, the communication module 14 can be a Bluetooth module, a WiFi module, a ZigBee module, an infrared module or other similar components.

The power supplying module 15 is connected to the touch point calculator 12, the controller 13 and the communication module 14 so as to power to the touch point calculator 12, the controller 13 and the communication module 14. In one embodiment, the power supplying module 15 can be a battery, a voltage converter or other similar component.

The embodiment just exemplifies the present invention and is not intended to limit the scope of the present invention; any equivalent modification and variation according to the spirit of the present invention is to be also included within the scope of the following claims and their equivalents.

Figure 2:
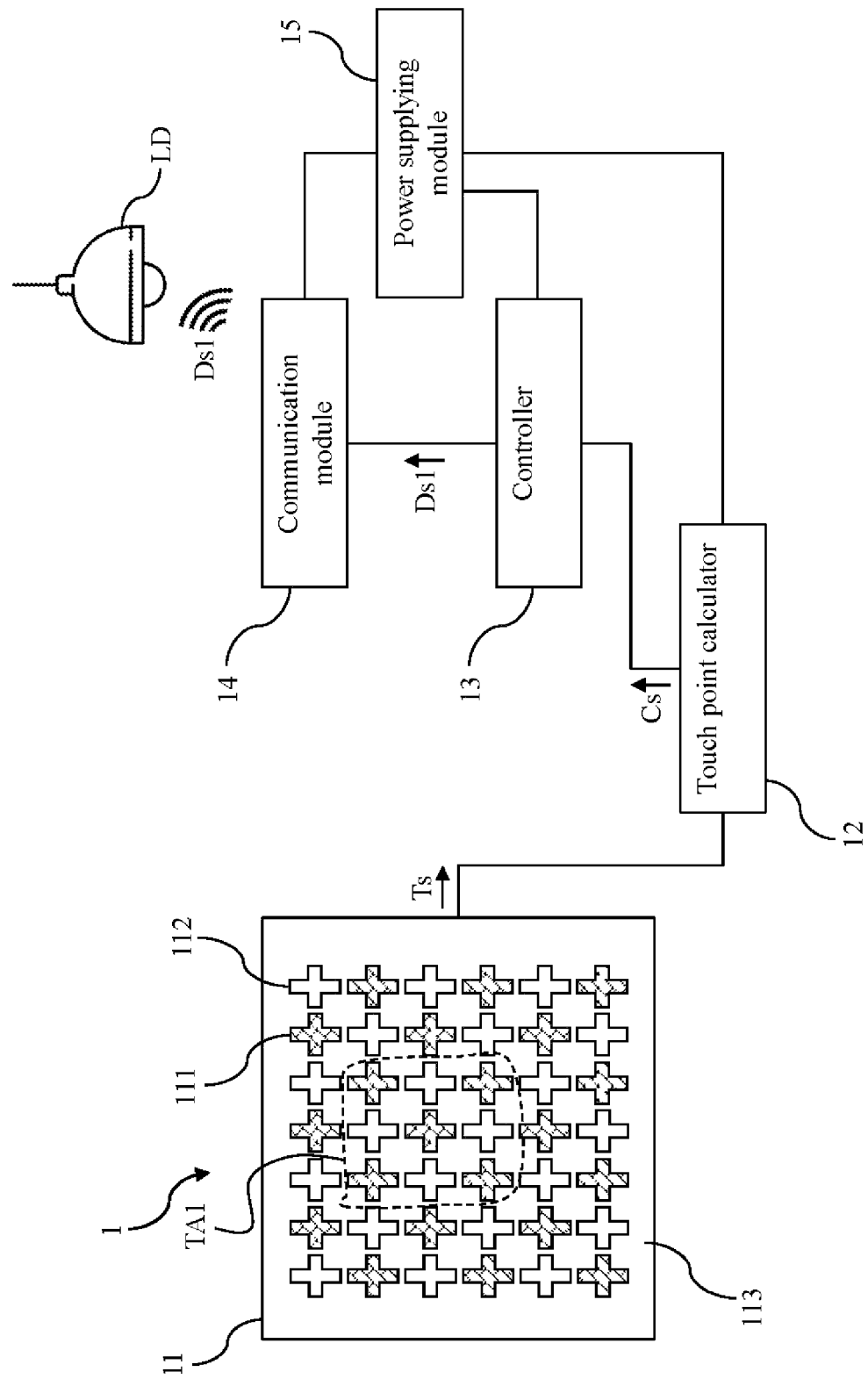
FIG. 2 is the first schematic view of the lighting parameter touch control panel in operating in accordance with one embodiment of the present invention.

Please refer to FIG. 2, which is the first schematic view of the lighting parameter touch control panel in operating in accordance with one embodiment of the present invention. As shown in FIG. 2, the initial voltage of each of the first touch points 111 is the first voltage, while the initial voltage of each of the second touch points 112 is the second voltage.

The first touch points 111 and second touch points 112 mentioned above can be connected to a control chip. In this way, the control chip can power (e.g., 3V~5V) the first touch points 111 and second touch points 112 so as to control the initial voltages of the first touch points 111 and second touch points 112. In this embodiment, the first voltage is of high level, while the second voltage is of low level. For example, the first voltage is 1V, and the second voltage is 0V. In another embodiment, the first voltage is of low level, while the second voltage is of high level.

When a target object (such as a user's finger or palm) touches the touch board 11, the target object, the first touch point 111 and the second touch point 112 within the touch area TA1 of the target object touching the touch board 11 form a conducting loop to generate a touch signal Ts.

When the target object simultaneously touches the first touch point 111 and second touch point 112 adjacent thereto, the voltages of the first touch points 111 decrease from the initial voltage to be less than 1, such that the target object, the first touch point 111 and the second touch point 112 form the conducting loop.

Afterward, the touch board 11 generates the touch signal Ts and transmits the touch signal Ts to the touch point calculator 12. The touch point calculator 12 then calculates the quantity of the first touch points 111 and second touch points 112 within the conducting loop based on the touch signal Ts, and generates a calculating signal Cs. Because the voltage of the first touch point 111 touched by the target object decreases to be less than 1, the calculating signal Cs represents the voltage of the first touch point 111 as 0. In this case, the calculating signal Cs can be represented as (0,0).

Finally, the controller 13 generates a lighting parameter adjusting signal Ds1 according to the calculating signal Cs and transmits the lighting parameter adjusting signal to the lighting device LD (e.g., an LED lamp, bulb, light tube, etc.) via the communication module 14.

In this embodiment, there are five first touch points 111 and four second touch points 112 within the touch area TA1 of the target object touching the touch board 11. The voltages of these five first touch points 111 decrease from the initial voltage to be less than 1, such that the target object, the five first touch points 111 and the four second touch points 112 form the conducting loop.

Subsequently, the touch board 11 generates the touch signal Ts and transmits the touch signal Ts to the touch point calculator 12. The touch point calculator 12 then calculates the quantity of the first touch points 111 and second touch points 112 within the conducting loop according to the touch signal Ts so as to generate the calculating signal Cs. Because the voltages of the five first touch points 111 touched by the target object decreases to be less than 1, the calculating signal Cs represents the voltages of these first touch points 111 as 0. In this case, the calculating signal Cs can be represented as (0, 0, 0, 0, 0, 0, 0, 0, 0), which can be a digital signal.

Finally, the controller 13 generates a lighting parameter adjusting signal Ds1 according to the calculating signal Cs and transmits the lighting parameter adjusting signal to the lighting device LD via the communication module 14. The controller 13 can determine whether the touch area TA1 is a light press or heavy press based on the quantity of the first touch points 111 and second touch points 112 within the touch area TA1. When the quantity of the first touch points 111 and second touch points 112 within the touch area TA1 is less than or equal to a predetermined threshold value (the predetermined threshold value in this embodiment is 9, but it can be adjusted according to actual requirements), the controller 13 determines the touch area TA1 as a light press and generates the lighting parameter adjusting signal Ds1, which is a dimming signal.

When the touch time of the target object on the touch board 11 exceeds a time threshold value (the preset time threshold value in this embodiment is 1 second, but it can be changed according to actual requirements), the controller 13 continuously outputs the lighting parameter adjusting signal Ds1 to the lighting device LD with a view to gradually increasing the brightness of the lighting device LD. If the brightness of the lighting device LD reaches maximum brightness, the brightness of the lighting device LD will gradually decrease. The controller 13 stops outputting the lighting parameter adjusting signal Ds1 to the lighting device LD when the target object stops touching the touch board 11. Therefore, the user can stop touching the touch board 11 when the brightness of the lighting device LD reaches the desired brightness. At the same time, the controller 13 also saves the current brightness so that when the lighting device LD is turned on again, it remains at this brightness. On the other hand, when the user quickly taps the touch board 11 twice in succession, the lighting device LD can be turned on or off.

The embodiment just exemplifies the present invention and is not intended to limit the scope of the present invention; any equivalent modification and variation according to the spirit of the present invention is to be also included within the scope of the following claims and their equivalents.

Figure 3:
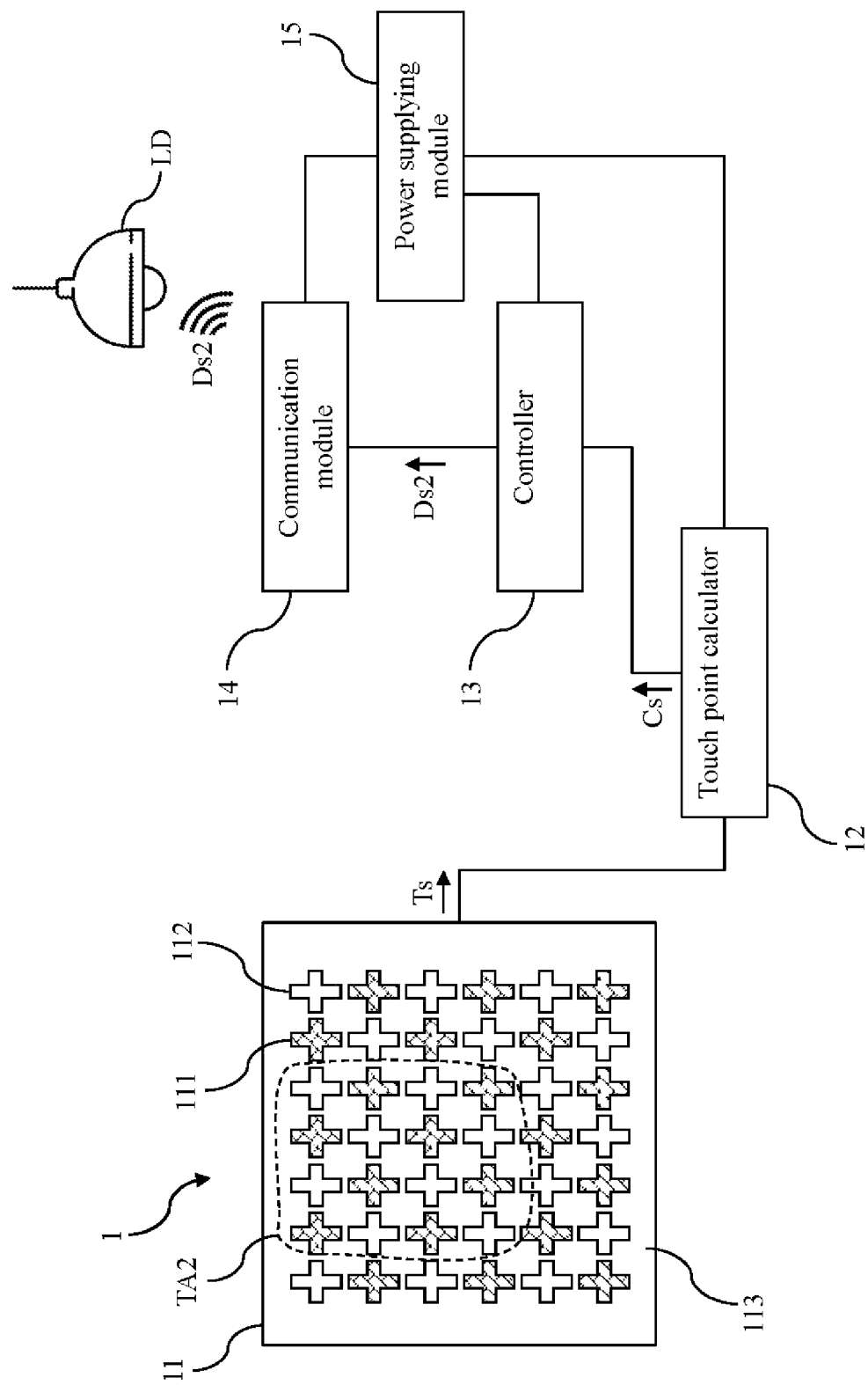
FIG. 3 is the second schematic view of the lighting parameter touch control panel in operating in accordance with one embodiment of the present invention.

Please refer to FIG. 3, which is the second schematic view of the lighting parameter touch control panel in operating in accordance with one embodiment of the present invention. As shown in FIG. 3, there are eight first touch points 111 and eight second touch points 112 within the touch area TA2 of the target object touching the touch board 11. The voltages of these eight first touch points 111 decrease to be less than 1, such that the target object, the eight first touch points 111 and the eight second touch points 112 form a conducting loop.

Then, the touch board 11 generates a touch signal Ts and transmits the touch signal Ts to the touch point calculator 12. The touch point calculator 12 calculates the quantity of first touch points 111 and second touch points 112 within the conducting loop according to the touch signal Ts, and generates a calculating signal Cs. Since the voltages of the eight first touch points 111 touched by the target object are reduced to be less than 1, the calculating signal Cs represents the voltages of these first touch points 111 as 0. In this case, the calculating signal Cs can be represented as (0, 0, 0, 0, 0, 0, 0, 0, 0, 0, 0, 0, 0, 0, 0, 0), which can be a digital signal.

Finally, the controller 13 generates a lighting parameter adjusting signal Ds2 according to the calculating signal Cs and transmits the lighting parameter adjusting signal Ds2 to the lighting device LD via the communication module 14. The controller 13 can obtain the quantity of first touch points 111 and second touch points 112 within the touch area TA2 according to the calculating signal Cs in order to determine whether the touch are TA2 is a light press or a heavy press. When the quantity of first touch points 111 and second touch points 112 within the touch area TA2 is greater than a predetermined threshold value, the controller 13 determines the touch area TA2 as a heavy press and generates the lighting parameter adjusting signal Ds2, which is a color temperature signal.

When the touch time of the target object on the touch board 11 exceeds a time threshold value (the time threshold value in this embodiment is 1 second, but the time threshold value can be adjusted according to actual needs), the controller 13 continuously outputs the lighting parameter adjusting signal Ds2 to the lighting device LD so as to gradually increase the color temperature of the lighting device LD. If the color temperature of the lighting device LD reaches the maximum color temperature, the color temperature of the lighting device LD will gradually decrease. The controller 13 stops outputting the lighting parameter adjusting signal Ds2 to the lighting device LD when the target object stops touching the touch board 11. Therefore, the user can stop touching the touch board 11 when the color temperature of the lighting device LD reaches the desired color temperature. Meanwhile, the controller 13 also saves the current color temperature, such that the lighting device LD will maintain this color temperature when the lighting device LD is turned on again.

As described above, it can be seen that the touch-controlled lighting parameter control panel 1 can accurately calculate the touch area of the target object to improve touch sensitivity. Therefore, the lighting parameter touch control panel 1 can not only control the on/off of the lighting device LD, but also can provide the dimming and color temperature adjustment functions. Therefore, the functionality of the touch-controlled lighting parameter control panel 1 is more comprehensive and user-friendly.

In addition, the lighting parameter touch control panel 1 has the communication module 14, so the lighting parameter touch control panel 1 can be used to control all lighting devices LD in a house. The user only needs to place the lighting parameter touch control panel 1 in a suitable location; then, the user can control all lighting devices LD wirelessly without the need to install any applications. Furthermore, the lighting parameter touch control panel 1 will not be influenced by network signals, compatibility and other factors. Therefore, the lighting parameter touch control panel 1 can meet the actual requirements.

Furthermore, the lighting parameter touch control panel 1 can achieve stepless dimming or color temperature adjusting functions, so the dimming and color temperature adjusting functions can be optimized. Therefore, users can adjust the lighting device LD through the lighting parameter touch control panel 1 to achieve the desired brightness and color temperature.

Moreover, as mentioned earlier, the first touch points 111 and multiple second touch points 112 can be cross-shaped. The structural design of the first touch points 111 and second touch points 112 can significantly increase the touch sensing range and enhance touch sensitivity.

The embodiment just exemplifies the present invention and is not intended to limit the scope of the present invention; any equivalent modification and variation according to the spirit of the present invention is to be also included within the scope of the following claims and their equivalents.

It is worthy to point out that the currently available smart home systems can provide the lighting control functions, but the lighting control functions of these smart home systems still have many shortcomings needed to be improved. On the contrary, according to one embodiment of the present invention, the touch board of the lighting parameter touch control panel has a special structure to provide a precise touch point calculation mechanism. As a result, the lighting parameter touch control panel can accurately calculate the touch area of the target object so as to enhance the touch sensitivity. Therefore, the lighting parameter touch control panel can not only control a lighting device to be turned on or off but also can provide the dimming and color temperature adjustment functions simultaneously. Consequently, the functionality of the lighting parameter touch control panel is more comprehensive and user-friendly.

Also, according to one embodiment of the present invention, the lighting parameter touch control panel is provided with a communication module, so the lighting parameter touch control panel can control all lighting devices within a house. The user can simply place the lighting parameter touch control panel in the appropriate location to control all lighting devices wirelessly, without the need to install any applications. Furthermore, the lighting parameter touch control panel will not be influenced by network signals, compatibility and other factors. Therefore, the lighting parameter touch control panel can conform to actual requirements.

Further, according to one embodiment of the present invention, the lighting parameter touch control panel is provided with a communication module, so the lighting parameter touch control panel can control all lighting devices within the house. The user can control all lighting devices wirelessly by placing the touch-sensitive lighting parameter control panel in the appropriate location without mechanical switches and complex wiring. Consequently, the lighting parameter touch control panel can significantly reduce the cost of smart home systems, so the application of the lighting parameter touch control panel can be more comprehensive.

Moreover, according to one embodiment of the present invention, the lighting parameter touch control panel can achieve stepless dimming and color temperature adjusting functions, so the lighting parameter touch control panel can provide optimized dimming and color temperature adjusting functions. Therefore, the user can adjust the lighting device via the lighting parameter touch control panel to achieve the desired brightness and color temperature. Consequently, the touch-sensitive lighting parameter control panel can meet the needs of different users and effectively improve the shortcomings of prior art.

Furthermore, according to one embodiment of the present invention, the lighting parameter touch control panel has a simple structure, so the lighting parameter touch control panel can achieve the desired technical effects without significantly increasing the cost thereof. Thus, the lighting parameter touch control panel can meet the requirements of various applications. Therefore, the manufacturing cost of the lighting parameter touch control panel can be greatly reduced, so the lighting parameter touch control panel can achieve high practicality. As set forth above, the lighting parameter touch control panel according to the embodiments of the present invention can definitely achieve great technical effects.

Figure 4:
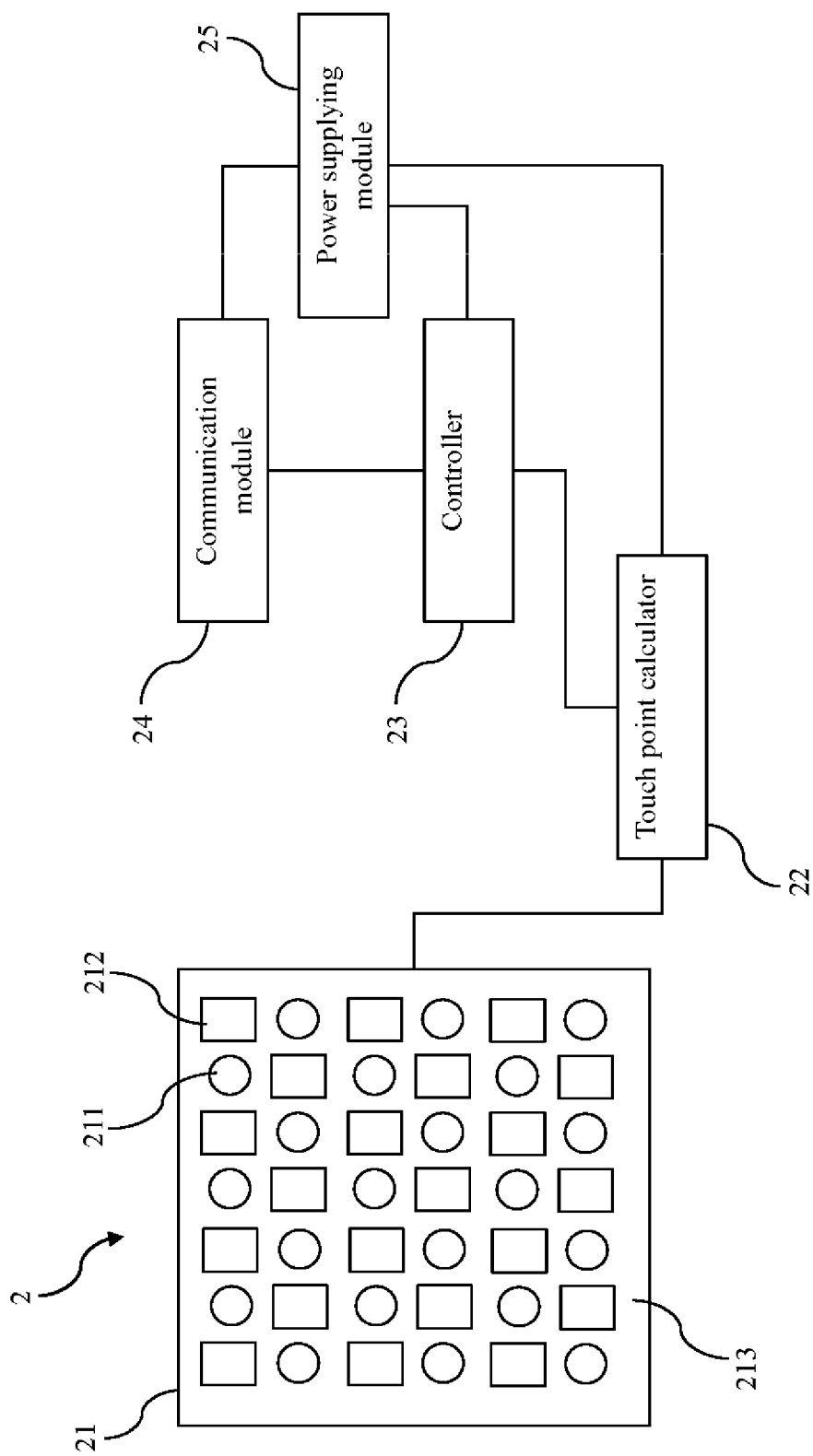
FIG. 4 is the schematic view of the structure of the lighting parameter touch control panel in accordance with another embodiment of the present invention.

Please refer to FIG. 4, which is the schematic view of the structure of the lighting parameter touch control panel in accordance with another embodiment of the present invention. As shown in FIG. 4, the touch-controlled lighting parameter control panel 2 includes a touch board 21, a touch point calculator 22, a controller 23, a communication module 24 and a power supplying module 25.

The touch board 21 includes a substrate 213, a plurality of first touch points 211, and a plurality of second touch points 212. The first touch points 211 and second touch points 212 are disposed on the substrate 213. The touch point calculator 22 is connected to the touch board 21. The controller 23 is connected to the touch point calculator 22. The communication module 24 is connected to the controller 23. The power supplying module 25 is connected to the touch point calculator 22, controller 23 and communication module 24 in order to power the touch point calculator 22, controller 23 and communication module 24.

The above elements are similar to those of the previous embodiment, so will not be described herein again. The difference between this embodiment and the previous embodiment is that the shapes of the first touch points 211 and second touch points 212. In this embodiment, the first touch points 211 are circular, while the second touch points 212 are rectangular. This embodiment is just for illustration; the shapes of the first touch points 211 and second touch points 212 can be changed according to actual needs.

Similarly, the lighting parameter touch control panel 2 can achieve stepless dimming and color temperature adjusting functions, so the lighting parameter touch control panel 2 can provide optimized dimming and color temperature adjusting functions. Therefore, users can adjust the lighting device via the lighting parameter touch control panel 2 to achieve the desired brightness and color temperature.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the touch board of the lighting parameter touch control panel has a special structure to provide a precise touch point calculation mechanism. As a result, the lighting parameter touch control panel can accurately calculate the touch area of the target object so as to enhance the touch sensitivity. Therefore, the lighting parameter touch control panel can not only control a lighting device to be turned on or off but also can provide the dimming and color temperature adjustment functions simultaneously. Consequently, the functionality of the lighting parameter touch control panel is more comprehensive and user-friendly.

Also, according to one embodiment of the present invention, the lighting parameter touch control panel is provided with a communication module, so the lighting parameter touch control panel can control all lighting devices within a house. The user can simply place the lighting parameter touch control panel in the appropriate location to control all lighting devices wirelessly, without the need to install any applications. Furthermore, the lighting parameter touch control panel will not be influenced by network signals, compatibility and other factors. Therefore, the lighting parameter touch control panel can conform to actual requirements.

Further, according to one embodiment of the present invention, the lighting parameter touch control panel is provided with a communication module, so the lighting parameter touch control panel can control all lighting devices within the house. The user can control all lighting devices wirelessly by placing the touch-sensitive lighting parameter control panel in the appropriate location without mechanical switches and complex wiring. Consequently, the lighting parameter touch control panel can significantly reduce the cost of smart home systems, so the application of the lighting parameter touch control panel can be more comprehensive.

Moreover, according to one embodiment of the present invention, the lighting parameter touch control panel can achieve stepless dimming and color temperature adjusting functions, so the lighting parameter touch control panel can provide optimized dimming and color temperature adjusting functions. Therefore, the user can adjust the lighting device via the lighting parameter touch control panel to achieve the desired brightness and color temperature. Consequently, the touch-sensitive lighting parameter control panel can meet the needs of different users and effectively improve the shortcomings of prior art.

Furthermore, according to one embodiment of the present invention, the lighting parameter touch control panel has a simple structure, so the lighting parameter touch control panel can achieve the desired technical effects without significantly increasing the cost thereof. Thus, the lighting parameter touch control panel can meet the requirements of various applications. Therefore, the manufacturing cost of the lighting parameter touch control panel can be greatly reduced, so the lighting parameter touch control panel can achieve high practicality.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting parameter touch control panel, comprising:
    a touch board comprising a plurality of first touch points and a plurality of second touch points disposed on the substrate and arranged in a staggered manner, wherein the first touch points are not adjacent to each other and the second touch points are not adjacent to each other; and
    a touch point calculator connected to the touch board;
    wherein the first touch point and the second touch point in a touch area, of the touch board, touched by a target object and the target object form a conducting loop to generate a touch signal, and the touch point calculator is configured to calculate a quantity of the first touch point and the second touch point in the conducting loop according to the touch signal so as to generate a calculating signal.

2. The lighting parameter touch control panel as claimed in claim 1, wherein an initial voltage of each of the first touch points is a first voltage and an initial voltage of each of the second touch points is a second voltage, and the first voltage is of high level and the second voltage is of low level.

3. The lighting parameter touch control panel as claimed in claim 2, wherein the initial voltage of the first touch point within the touch area decreases, whereby the first touch point, the second touch point and the target object form the conducting loop.

4. The lighting parameter touch control panel as claimed in claim 1, further comprising a controller configured to generate a lighting parameter adjusting signal according to the calculating signal.

5. The lighting parameter touch control panel as claimed in claim 4, wherein the lighting parameter adjusting signal is a dimming signal or a color temperature adjusting signal.

6. The lighting parameter touch control panel as claimed in claim 4, further comprising a communication module, wherein the controller is configured to transmit the lighting parameter adjusting signal to a lighting device via the communication module.

7. The lighting parameter touch control panel as claimed in claim 6, further comprising a power supplying module connected to the touch point calculator, the controller and the communication module, wherein the power supplying module is configured to power the touch point calculator, the controller and the communication module.

8. The lighting parameter touch control panel as claimed in claim 7, wherein the power supplying module is a battery or a voltage converter.

9. The lighting parameter touch control panel as claimed in claim 7, wherein the calculating signal is a digital signal.

* * * * *